(12) United States Patent
Nolet et al.

(10) Patent No.: US 10,350,827 B2
(45) Date of Patent: Jul. 16, 2019

(54) POSITION DETECTION TECHNIQUES FOR ADDITIVE FABRICATION AND RELATED SYSTEMS AND METHODS

(71) Applicant: Formlabs, Inc., Somerville, MA (US)

(72) Inventors: Alexander Nolet, Francestown, NH (US); Benjamin FrantzDale, Harvard, MA (US); Dmitri Megretski, Carlisle, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 15/634,055

(22) Filed: Jun. 27, 2017

(65) Prior Publication Data

US 2017/0368747 A1    Dec. 28, 2017

Related U.S. Application Data

(60) Provisional application No. 62/354,955, filed on Jun. 27, 2016.

(51) Int. Cl.
*G01B 21/02* (2006.01)
*B29C 64/232* (2017.01)
(Continued)

(52) U.S. Cl.
CPC .......... *B29C 64/227* (2017.08); *B29C 64/124* (2017.08); *B29C 64/232* (2017.08);
(Continued)

(58) Field of Classification Search
CPC ....... G01L 5/0076; G01L 5/00; B29C 64/124; B29C 64/232; B29C 64/393;
(Continued)

(56) References Cited

U.S. PATENT DOCUMENTS 5,035,599 A * 7/1991 Harashima .............. B29C 45/03
264/40.5
6,483,596 B1 * 11/2002 Philippi ............. G05B 19/4015
156/272.8
(Continued)

OTHER PUBLICATIONS

International Search Report and Written Opinion for International Application No. PCT/US17/39443 dated Sep. 14, 2017.

*Primary Examiner* — Harshad R Patel
*Assistant Examiner* — Brandi N Hopkins
(74) *Attorney, Agent, or Firm* — Wolf, Greenfield & Sacks, P.C.

(57) ABSTRACT

Techniques for measuring a position of a build platform in an additive fabrication device are provided. Such techniques may include detecting the onset and/or dissipation of force applied to a build platform as it moves from being in contact with, to being out of contact with, a container. In some embodiments, the techniques described herein may be applied in a stereolithographic additive fabrication device. According to some embodiments, measurement of forces applied to a build platform may be used to provide for reliable and consistent measurements of the height of the build platform relative to a container by measuring such forces at various positions of the build platform and analyzing the pattern of the forces with distance from the container.

14 Claims, 4 Drawing Sheets

(51) Int. Cl.
    *B29C 64/124*     (2017.01)
    *B29C 64/227*     (2017.01)
    *B29C 64/393*     (2017.01)
    *G01B 5/06*     (2006.01)
    *G01L 5/00*     (2006.01)
    *B33Y 30/00*     (2015.01)
    *B33Y 50/02*     (2015.01)

(52) U.S. Cl.
    CPC ............ B29C 64/393 (2017.08); G01B 5/061 (2013.01); G01B 21/02 (2013.01); G01L 5/0076 (2013.01); *B33Y 30/00* (2014.12); *B33Y 50/02* (2014.12)

(58) Field of Classification Search
    CPC .............. B29C 64/227; B29C 67/0088; B29C 67/0085; B29C 67/0066; B29C 64/245; B29C 64/20; B29C 64/386; B29C 64/135; B33Y 30/00; B33Y 50/02; B33Y 10/00; G01B 21/02; G01B 5/061; G01B 5/06
    See application file for complete search history.

(56) References Cited

U.S. PATENT DOCUMENTS

| | | | |
|---|---|---|---|
| 2007/0070313 A1* | 3/2007 | Eussen | G03F 7/70775 355/53 |
| 2012/0291701 A1* | 11/2012 | Grasegger | B33Y 30/00 118/300 |
| 2013/0050670 A1* | 2/2013 | Koenen | H01L 23/544 355/67 |
| 2014/0085620 A1* | 3/2014 | Lobovsky | G03F 7/70775 355/72 |
| 2015/0064298 A1* | 3/2015 | Syao | B29C 67/0062 425/169 |
| 2016/0052205 A1* | 2/2016 | FrantzDale | B29C 67/0066 264/401 |
| 2016/0096332 A1* | 4/2016 | Chen | B33Y 30/00 425/162 |
| 2017/0246797 A1* | 8/2017 | Lambrecht | B33Y 10/00 |

\* cited by examiner

POSITION DETECTION TECHNIQUES FOR ADDITIVE FABRICATION AND RELATED SYSTEMS AND METHODS

CROSS REFERENCE TO RELATED APPLICATIONS

The present application claims the benefit under 35 U.S.C. § 119(e) of U.S. Provisional Patent Application No. 62/354,955, filed Jun. 27, 2016, titled "Position Detection Techniques For Additive Fabrication And Related Systems And Methods," which is hereby incorporated by reference in its entirety.

FIELD OF INVENTION

The present invention relates generally to systems and methods for detecting the position of a build platform within an additive fabrication (e.g., 3-dimensional printing) device.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or the surface of the substrate.

SUMMARY

Systems and methods for detecting the position of a build platform of an additive fabrication device are provided.

According to some aspects, an additive fabrication device is provided configured to form layers of material on a surface of a build platform, the additive fabrication device comprising a container having an interior surface, a build platform having a build surface that opposes the interior surface of the container, one or more actuators configured to move the build platform relative to the container, and at least one controller configured to move the build platform toward the container, wherein during at least part of said movement the build surface is in contact with the interior surface of the container, move the build platform away from the container, wherein during at least part of said movement the build surface is not in contact with the interior surface of the container, measure a force applied to the build platform during said step of moving the build platform away from the container, and determine a position of the build platform relative to the container based at least in part on the measured force.

According to some aspects, a method is provided for determining a position of a build platform in an additive fabrication device, the method comprising moving the build platform toward a surface opposing a build surface of the build platform, wherein during at least part of said movement the build surface is in contact with the opposing surface, moving the build platform away from the opposing surface, wherein during at least part of said movement the build surface is not in contact with the opposing surface, measuring a force applied to the build platform during said step of moving the build platform away from the opposing surface, and determining a position of the build platform relative to the opposing surface based on the measured force.

The foregoing summary is provided by way of illustration and is not intended to be limiting.

BRIEF DESCRIPTION OF DRAWINGS

The accompanying drawings are not intended to be drawn to scale. For purposes of clarity, not every component may be labeled in every drawing. In the drawings.

DETAILED DESCRIPTION

Figure 1A:
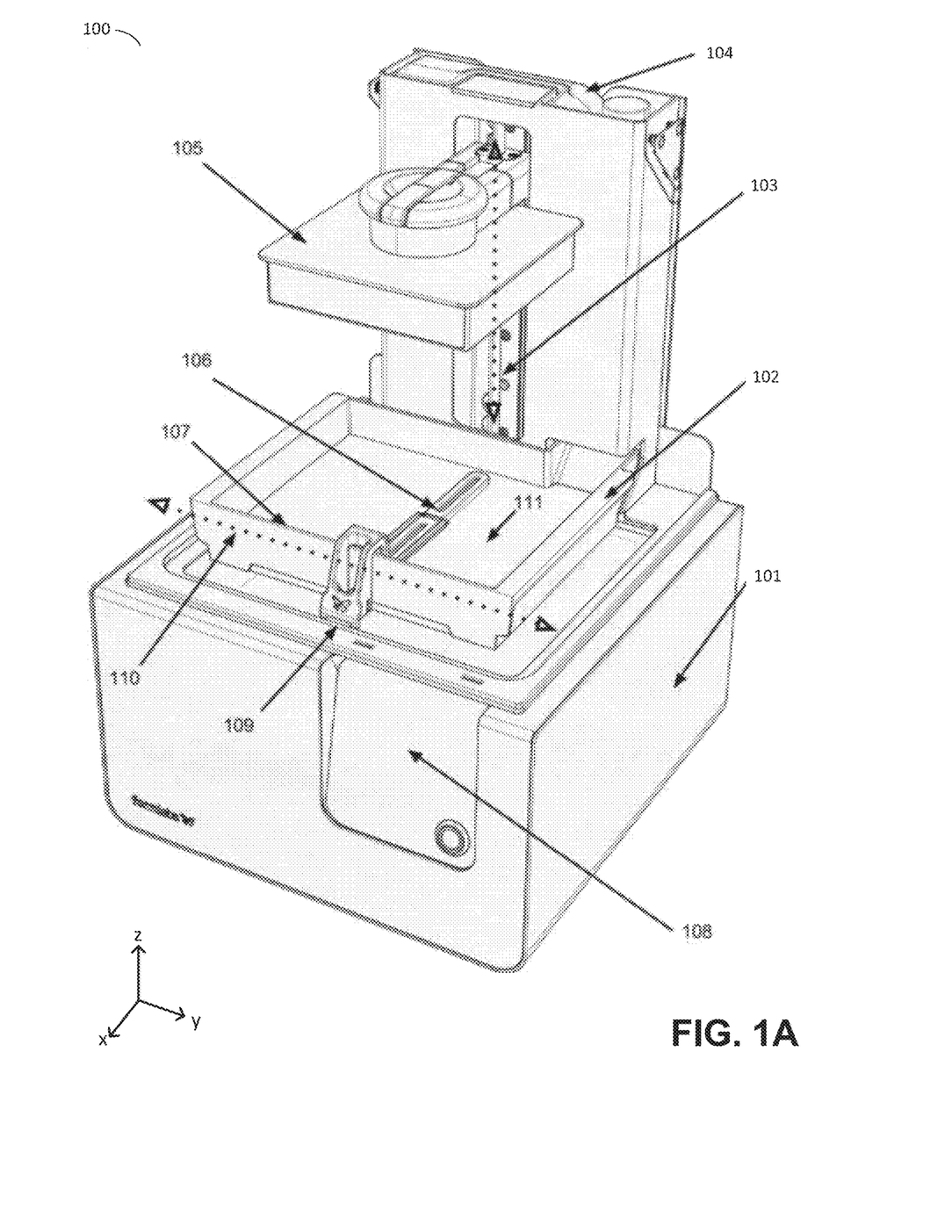
FIGS. 1A-B depict an illustrative additive fabrication device, according to some embodiments.
Figure 1B:
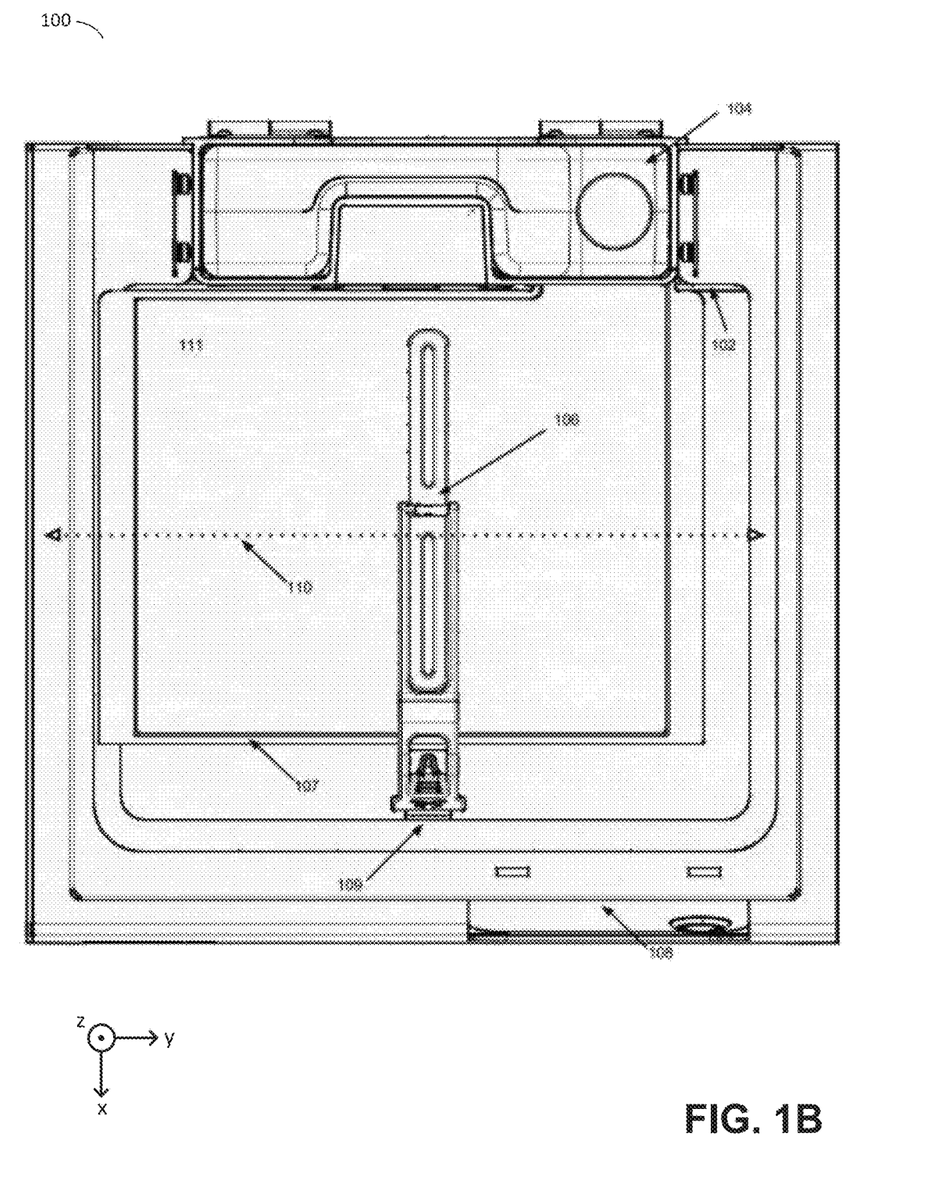

Systems and methods for detecting the position of a build platform are provided. As discussed above, in additive fabrication, a plurality of layers of material may be formed on a build platform. To illustrate one exemplary additive fabrication system, an inverse stereolithographic printer is depicted in FIGS. 1A-B. Illustrative stereolithographic printer 100 comprises a support base 101, a display and control panel 108, and a reservoir and dispensing system 104 for storage and dispensing of liquid photopolymer (e.g., photopolymer resin) into a container 102. The support base 101 may contain various mechanical, optical, electrical, and electronic components that may be operable to fabricate objects using the system.

During operation, liquid photopolymer may be dispensed from the dispensing system 104 into container 102. Build platform 105 may be moveable along a vertical axis 103 (oriented along the z-axis direction as shown in FIGS. 1A-B) such that the bottom facing layer (lowest z-axis position) of an object being fabricated, or the bottom facing layer of build platform 105 itself, is a desired distance along the z-axis from the interior surface 111 of container 102. The desired distance may be selected based on a desired thickness of a layer of solid material to be produced on the build platform or onto a previously formed layer of the object being fabricated.

In the example of FIGS. 1A-B, the interior surface 111 of container 102 may be (at least partially) transparent to actinic radiation that is generated by a radiation source (not shown) located within the support base 101, such that liquid photopolymer located between the interior surface 111 of container 102 and the bottom facing portion of build platform 105 or an object being fabricated thereon, may be exposed to the radiation. Upon exposure to such actinic radiation, the liquid photopolymer may undergo a chemical reaction, sometimes referred to as "curing," that substantially solidifies and attaches the exposed polymer to the bottom facing portion of build platform 105 or to an object being fabricated thereon. FIG. 1 represents a configuration of stereolithographic printer 101 prior to formation of any layers of an object on build platform 105, and for clarity also omits any liquid photopolymer from being shown within the depicted container 102.

Following the curing of a layer of material, a separation process is typically conducted so as to break any bonds (e.g., adhesive bonds) that may have been produced between the cured material and the interior surface 111 of container 102. As one example, build platform 105 may be moved along the vertical axis of motion 103 in order to reposition the build platform 105 for the formation of a new layer and/or to impose separation forces upon any bond with the interior surface 111 of container 102. In addition, container 102 is mounted onto the support base such that the stereolithographic printer 101 may move the container along horizontal axis of motion 110, the motion thereby advantageously introducing additional separation forces in at least some cases. A wiper 106 is additionally provided, capable of motion along the horizontal axis of motion 110 and which may be removably or otherwise mounted onto the support base at 109. The wiper arm may be operated to redistribute liquid photopolymer around the container 102 and/or to move any partially cured portions of photopolymer away from regions of the container used to cure additional material.

Figure 2:
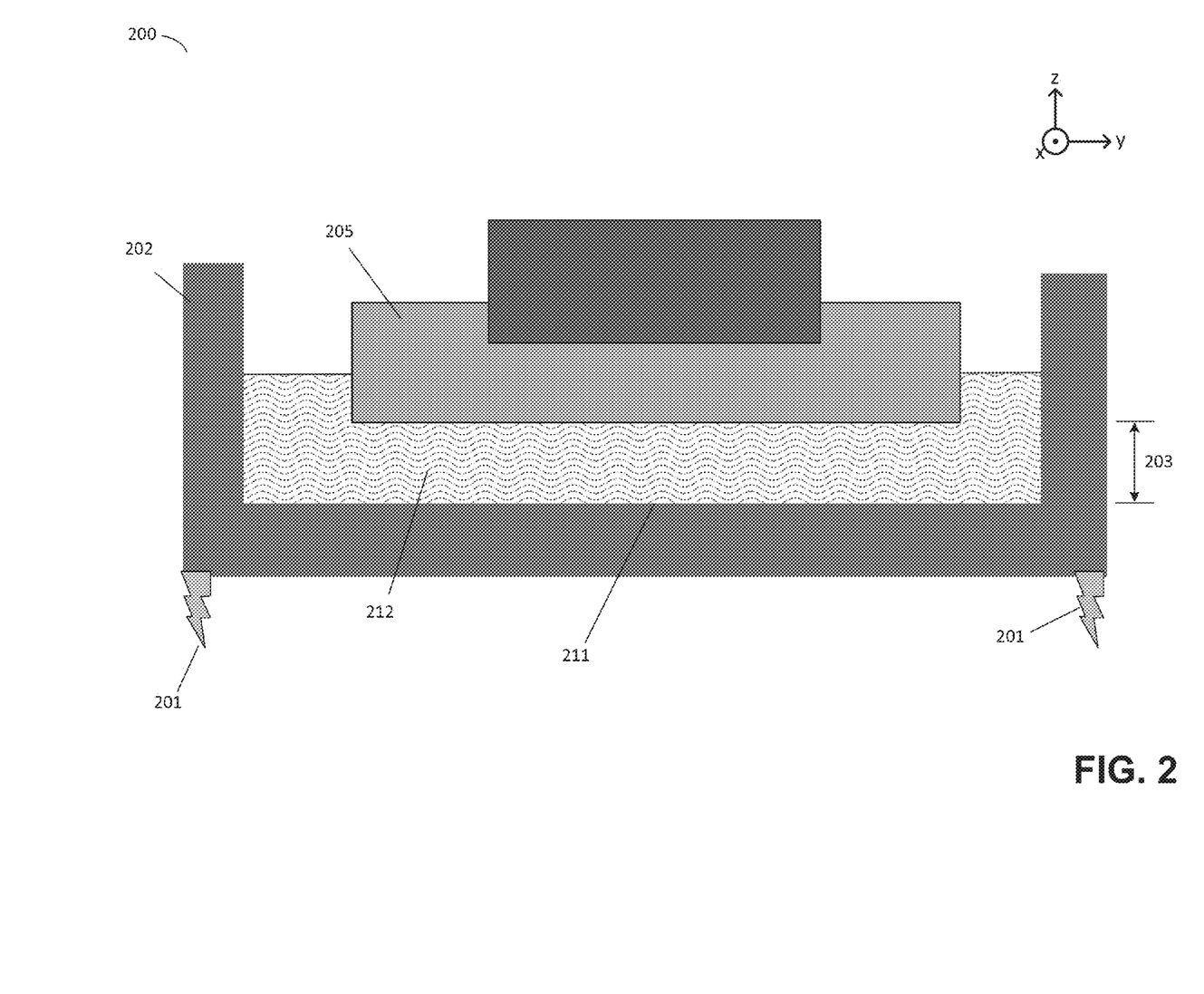
FIG. 2 provides a schematic view of an additive fabrication device, according to some embodiments.

To further illustrate aspects of the additive fabrication process described above, FIG. 2 depicts a schematic of an inverse stereolithographic printer 200. In the example of FIG. 2, stereolithographic printer 200 comprises a build platform 205, a container 202, a leveling mechanism 201, and liquid photopolymer (e.g., photopolymer resin) 212. The downward facing build platform 205 opposes the interior surface 211 of the container 202, which holds the liquid photopolymer 212.

FIG. 2 represents a configuration of stereolithographic printer 200 prior to formation of any layers of a part on build platform 205. Prior to the formation of any layers of the part, it may be advantageous to determine the distance between the build platform 205 and the interior surface of the container 202, labeled in FIG. 2 as surface 211. This distance is referred to herein as the "z-axis gap," or more simply $Z_{height}$, and is shown in FIG. 2 as distance 203. Subsequent to positioning of the build platform at $Z_{height}$, some or all of the liquid photopolymer located between the build platform and the bottom of the container may be cured (e.g., by directing actinic radiation through the base of the container onto the resin as described above).

As described above, stereolithographic printers 100 and 200 shown in FIGS. 1A-B and FIG. 2, respectively, may cure regions of liquid photopolymer in contact with both a desired build surface (e.g., the build platform 105 or 205 and/or a previously formed layer of material) and an opposing surface 111 or 211 to form layers of solid polymer. Such an approach may be employed in systems sometimes known as "inverted" stereolithography machines, where actinic radiation is introduced through an optical window in the bottom of a container.

In such machines, and others, $Z_{height}$ can be adjusted with a high degree of precision, yet accurately determining a present value of $Z_{height}$ can be challenging. Knowing $Z_{height}$ can be important since this distance substantially controls the thickness of cured photopolymer located between the build surface and an opposing surface (e.g., the bottom 211 of container 202 in the example of FIG. 2). That is, when curing a layer of liquid photopolymer, $Z_{height}$ is adjusted to be equal to the desired layer thickness, which may be only a few microns in size. Achieving the requisite degree of precision without increasing the cost and complexity of the machine has, however, heretofore presented significant challenges.

In some additive fabrication systems, movement of a build platform may be effected via an open-loop motion control system, such as one or more stepper motors, that provide repeatable movements yet do not provide feedback regarding the absolute position of the motor. If the motor(s) are used to move a build platform, therefore, the system may not have direct knowledge of the platform's position based on operation of the motor(s). In some implementations, optical or mechanical sensors may be configured at one end of a z-axis path in order to detect when a build platform has reached the maximum or minimum extent in that direction and thus determine when the build platform is at a fixed position along the z-axis. This location is sometimes referred to as a $Z_{max}$ or $Z_{min}$ since it represents either the largest or smallest z-axis position at which the build platform may be positioned. Once the build platform is moved to the $Z_{max}$ or $Z_{min}$ position, the system can then estimate the subsequent position of the build platform based on how the control system has moved the build platform since it was at the $Z_{max}$ or $Z_{min}$. Such an estimate may, however, be subject to increasing inaccuracies over time due to drift in the estimate and actual motions of the motors or other actuators.

Notwithstanding these difficulties, it would be desirable to directly determine the position of the build platform along the z-axis at which the bottom surface of the build platform is flush against the opposing surface, without exerting undesired force against said surface. This location is sometimes referred to as $Z_0$, being the point at which $Z_{height}=0$ in a suitably chosen coordinate system.

It is, however, frequently undesirable to use mechanical or optical sensing means located at or near $Z_0$ such as may be used to determine $Z_{height}$. For instance, the addition of such a sensor may increase the complexity and cost of the system. Further, in some implementations the container may be a removable component of the system, which may complicate the mounting and calibration of a sensor at or near to $Z_0$ if the sensor is to be placed in such a way as to not unduly interfere with insertion and removal of the container. Alternatively, manual user calibration may be performed, but this necessarily requires inconveniencing a user of the system and is therefore undesirable.

Even with a mechanical or sensing means located at or near $Z_0$, there may be further complexities to accurately determining a value of $Z_{height}$. For example, changes in the device geometry due to exchange of the container for a different container (which may ostensibly be identical but may exhibit minor manufacturing variances) may produce further inaccuracies in the estimated value of $Z_0$ and/or $Z_{height}$. In some cases, the correct value of $Z_0$ may change within an operation cycle of the device due to distortion of the device under load.

To more accurately determine $Z_{height}$, one technique may be to take measurements of mechanical load in the motion of the build platform in order to detect when the bottom surface of the build platform contacts with the opposing surface (the interior surface of the container) as it is moved towards it. As one, non-limiting and simplified example of such a technique, the build platform may be lowered directly towards the opposing surface. During said motion, the loading placed upon the motion system for the build platform may be repeatedly measured using a suitable technique. For example, some stepper motor systems include sensors that measure back electromotive force ("back EMF") in the motor (e.g., the stallGuard2 feature present in stepper motion control systems sold by TRINAMIC Motion Control GmbH & co KG). One technique for measuring loading placed upon the motion system for the build platform may therefore include measuring the back EMF of the motion system. Alternatively or additionally, some approaches to measure load upon the build platform may measure said loading using torque and/or force sensors. Irrespective of the particular sensor used to measure said mechanical load, the measured load typically increases upon contact with the opposing surface as compared to the load placed upon the motion system prior to contact with the opposing surface due to the opposing surface mechanically resisting said motion to some extent. In theory, the onset of this increase may be used in order to identify the position in which the build platform first contacts the opposing surface (i.e., $Z_0$).

Such techniques, however, suffer from a number of deficiencies. For example, the forces applied by the build platform against the opposing surface may cause mechanical deformation of the apparatuses supporting said platform and surfaces, and these deformations may introduce significant errors into the measurement process. In addition, and particularly with respect to systems utilizing a liquid photopolymer build material, the loads caused by the motion of the build platform may increase as it approaches the opposing surface but prior to making physical contact with the opposing surface due to the viscosity of the build material. This may be caused, among other reasons, due to forces involved in the displacement of liquids by the motion of the build platform. Such gradually changing load measurements increase the difficulty and reduce the accuracy of determining when the build platform has reached the $Z_0$ position based upon changes of load measurements.

The inventors have recognized and appreciated that the above-described difficulties in measuring $Z_0$ may be mitigated by utilizing feedback from the motion of the build platform away from the opposing surface, rather than towards it, in order to determine the location of the build platform in relation to the opposing surface and thus determine $Z_0$. In particular, the inventors have appreciated that during the operation of many systems, such as vat-based liquid photopolymer systems, significant forces resist the separation of the build platform and opposing surface (e.g., bottom of the resin container), once they are located flush to one another at $Z_0$. These separation-resisting forces are exerted only while the build platform is comparatively close to the opposing surface and rapidly decay as it moves away from the opposing surface. By measuring the onset and dissipation of these forces as a function of z-axis height, a value for $Z_0$ may be determined.

Figure 3A:
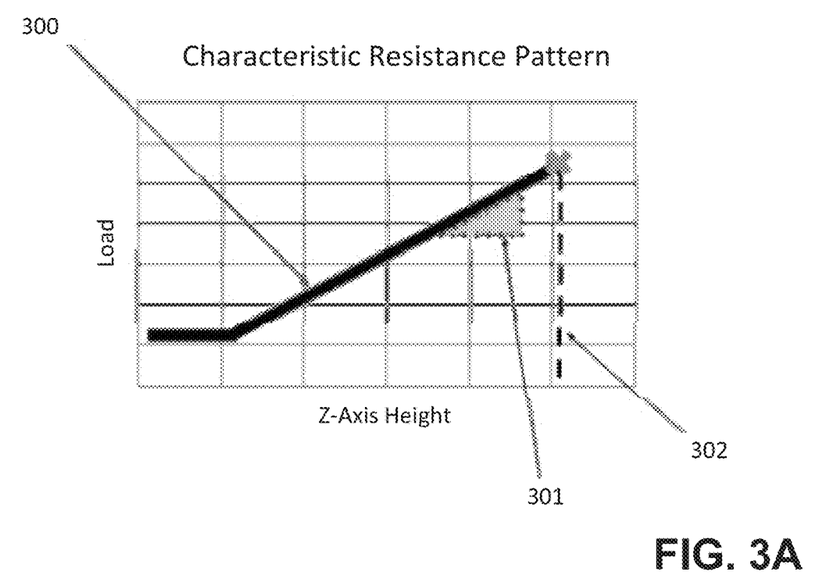
FIGS. 3A-3B depict graphs of illustrative relationships between a load applied and a z-axis height, according to some embodiments.
Figure 3B:
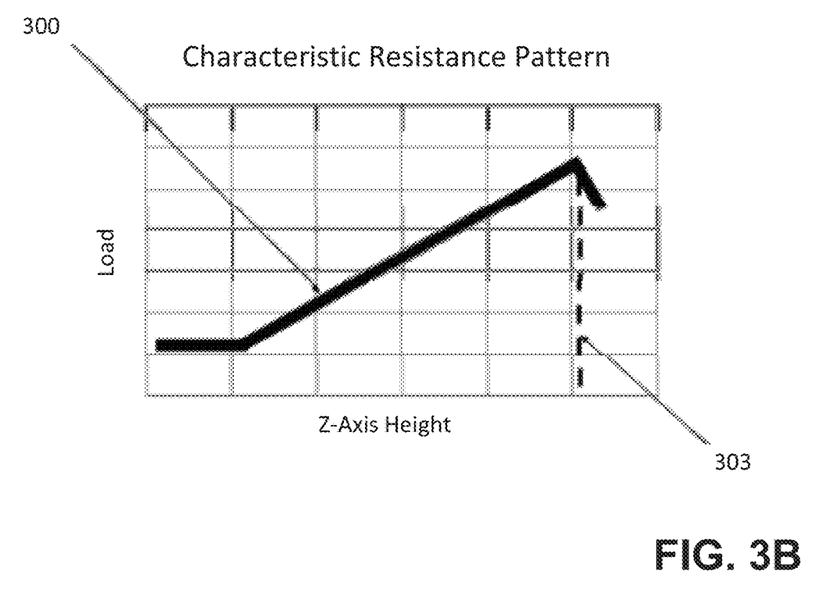

FIGS. 3A-B illustrate examples of the force measured at various z-axis heights (e.g., the height 203 for illustrative system 200 shown in FIG. 2). In vat-based photopolymer systems, such as the one shown in FIG. 2, significant forces may resist the separation of a build platform and an opposing surface due to the fluid flow of liquid photopolymer and vacuum pressures created between the separating build platform and an opposing surface. In alternative systems, forces that resist separation of the build platform from an opposing surface may be artificially introduced, such as by the use of magnetic fields that attract the build platform and opposing surface to one another when placed in proximity (e.g., by installing one or more magnets in the build platform and the structure of the opposing surface). Irrespective of which mechanism produces forces that resist separation of the build platform from an opposing surface, the inventors have appreciated that measurement of such forces may be used to provide for reliable and consistent measurements of $Z_0$ by measuring such forces at various positions of the build platform and analyzing the resistance pattern as discussed below.

Aspects of the present invention may be appreciated in the context of the illustrative embodiment shown in FIG. 2, wherein a surface opposing a surface of a build platform is represented by the interior surface 211 of a liquid photopolymer container. In the illustrative system 200, the container is mounted such that it is held flush against a hard stop by a compressive device, such as a spring 201, but is capable of being deflected away from the hard stop such that the compressive devices are compressed or stretched. Illustrative techniques for such compression are described in U.S. Patent Application Pub. No. US2014/0085620 A1, which is incorporated herein by reference in its entirety. During operation, the container 201 contains a volume of liquid photopolymer 212 such that the lower surface of build platform 205 may be lowered into said volume (as shown in FIG. 2). In some embodiments, the build platform may be attached to a motion system that is capable of measuring relative changes to one or more of resistance to motion (load), acceleration, and/or forces exerted through the motion system. As discussed above, for example, load may be determined in some embodiments by detection and measurement of the magnitude of back EMF currents using a "stallguard" feature of a stepper driver or otherwise.

In this illustrative embodiment, the build platform 205 may be moved away from the opposing surface until a mechanical or optical limit switch is reached, establishing the location of the $Z_{max}$ point. As a next step, the build platform 205 is then moved towards the opposing surface 211 a distance that is expected to cause the build platform 205 to contact the surface and compress the surface away from its rest position through the compressive device(s) 201. Following this compression, the motion of the build platform 205 is reversed and it is moved away from the opposing surface.

FIGS. 3A and 3B are graphs depicting the load forces of the system during the build platform's movement along the Z-axis. During this motion, the forces exerted against the build platform may be determined in order to more accurately assess when the build platform separates from the opposing surface.

The examples of FIGS. 3A and 3B illustrate different techniques for determining $Z_{height}$ by registering load applied to the build platform as it is moved away from an opposing surface. While multiple forces may act to resist the motion of the build platform, the inventors have observed that there may be a characteristic pattern of resistance as the platform is moved through the location corresponding to $Z_0$. Illustrative examples of this pattern are provided as FIGS. 3A and 3B, which plot load measurements versus the position of the build platform. In both FIG. 3A and FIG. 3B, the z-axis height increases from left to right in the figure, with the left side of each graph representing a position in which the build platform is contacting the opposing surface.

As shown by line 300, during an initial phase of the operation the motion of the build platform away from the opposing surface is met with comparatively little resistance. This portion is illustrated in FIGS. 3A and 3B as the horizontal flat portion of line 300 on the left side of each graph.

In the context of the example of FIG. 2, horizontal phase of line 300 may be linear or non-linear as a function, depending on the mechanical nature of the compressive devices 201. During this phase, the bottom surface of the build platform and the opposing surface are typically still flush to one another such that the motion of the build platform is matched by the motion of the opposing surface as the compression of the compressive devices 201 is gradually released. At a subsequent stage, the opposing surface 211 reaches a "hard stop" in its range of motion (e.g., due to complete release of compressive devices) and no longer moves with the build platform 205. At this stage, the build platform 205 may only continue to move by separating from the opposing surface. However, because the build platform is immersed in liquid photopolymer 212 when at or near the opposing surface, significant fluid forces are then exerted upon it that resist separation of the build platform 205 and the opposing surface 211.

The beginning of the separation process is thus associated with a sharp and substantial increase in resistance to motion, as can be seen in FIGS. 3A and 3B, depicting a gradually increasing load above a particular value of the z-axis height. By monitoring the load, forces, or motion of the build platform, the onset of this substantial increase may be reliably detected. The inventors have observed that the onset of the increased load is closely associated in time with the bottom of the build platform being located at $Z_0$— that is, the location of the build platform along the z-axis at which the bottom surface of the build platform is flush against the opposing surface, without exerting undesired force against said surface.

The inventors have recognized that there are at least two techniques that can be used to identify the above-described increase in load and utilize this recognition to determine a value of $Z_0$. These techniques are depicted in FIGS. 3A and 3B, respectively.

In the example of FIG. 3A, the gradient 301 of the portion of the curve during separation may be measured. The shape of the curve in this portion corresponding to separation may be linear or non-linear; while the forces (e.g., fluid forces) may approximate Hooke's law in the load they apply to the build platform, components of the system during separation may flex introducing non-linearities in the load that is applied as a function of z-axis height. For example, the build platform and/or the opposing surface that the build platform is contacting may flex under the load. In the approach depicted in FIG. 3A, the curve may be assumed to be substantially linear and the gradient 301 measured. A value of $Z_0$ may then be determined by extrapolating the load to a value at which separation is assumed to occur and determining the corresponding z-axis value, shown in FIG. 3A at a set point 302.

The example of FIG. 3B depicts a technique whereby the stepper motor control system is used to determine a point at which the gradually increasing load suddenly decreases, corresponding to the build platform overcoming the forces that restrain the platform from separating from the opposing surface and breaking free. This point is shown in FIG. 3B as having z-axis height 303. This point can be measured in various ways. For example, $Z_0$ can be determined by calculating the derivative of the function plotted in FIG. 3B. The sharp and substantial increase in resistance to motion causes the derivative of line 300 to change substantially. By way of example, FIG. 3B shows point 303 as a change from a positive derivative to a negative derivative. While the discontinuity is shown in FIG. 3B as a rapid change in the derivative of the function, the rate of change of the rate of change of the line 300 need not, in every case, be so dramatic and the gradient could instead change more gradually. Nonetheless, a z-axis height value for $Z_0$ may be identified in any case by, for example, identifying a z-axis height at which the gradient begins to change more quickly than a threshold value.

It may be noted that, in the technique of FIG. 3B, the function of line 300 does not need to be a known function or assumed to be linear as in the case of the technique of FIG. 3A. Rather, the value of $Z_0$ is determined by calculating the derivative (and/or higher order derivatives) of the rate of change of the load with z-axis height and identifying a change in the derivative corresponding to a moment of separation between the build platform and the opposing surface.

Following the determination of $Z_0$, the build platform may be moved away from the opposing surface, with the distance moved being $Z_{height}$ 203. Based upon these measurements, accurate repositioning is possible with regards to both $Z_0$ and $Z_{max}$.

According to some embodiments, a number of additional techniques may be further included, in any suitable combination, with any of the techniques discussed above. In one additional technique, it may be advantageous to wait a period of time, known as a squish wait, between positioning the build platform flush against the opposing surface prior to beginning the separation process. This time period allows for the system to return to an equilibrium condition, including the motion of liquid photopolymer displaced by the motion of the build platform. In another additional technique, it may be advantageous in liquid photopolymer-based systems to combine the above procedure for determining $Z_0$ with the exposure and curing of an initial layer of photopolymer material. This may be accomplished by positioning the build platform an approximate distance away from the opposing surface, said distance being predicted to be somewhere between $Z_0$ and the cure depth of the actinic radiation being directed into the liquid photopolymer, and then curing a large, initial "raft" layer of photopolymer material between the opposing surface and the bottom of the build platform. Such a combination has several advantages, including reducing the amount of time spent in calibration prior to the beginning of the build process. In addition, the cured material between the build platform and opposing surface may increase the force differences utilized in the above procedure and thus ensure a cleaner signal for the determination process.

Although techniques have been described with respect to specific embodiments above, it will be appreciated by those in the art that the description herein is intended to cover all modifications and equivalents within the scope of the following claims, and the particular embodiments presented above are not intended to be limiting. For example, while the above techniques have been described in the context of the build platform of an additive fabrication device, it will be recognized that, at least in some circumstances, it may be convenient to determine a value of $Z_0$ during fabrication of a part. This may be performed in addition to, or as an alternative to, determining $Z_0$ prior to fabrication using the surface of the build platform. To determine $Z_0$ during fabrication, the above-described techniques to measure $Z_0$ may be applied whilst using the surface of the most-recently fabricated layer of the part instead of the surface of the build platform to make contact, and apply force to, an opposing surface such as the bottom of a container. While in some cases this may result in damage to the part, in at least some instances, such as when the most-recently fabricated layer has a large surface area (e.g., is part of a raft, or otherwise), such damage may be minimal or not produced.

Furthermore, while examples have been given with respect to a liquid photopolymer additive fabrication system, the above-described techniques may be applied within other liquid additive fabrication systems or additive fabrication systems that do not utilize liquids. For example, a build surface of a fused deposition modeling (FDM) device may be contacted with an opposing surface and magnetic forces and/or other suitable forces may be introduced that resist separation of the two surfaces. As such, the techniques described herein are not limited to use within stereolithography, but can be applied to determine $Z_0$ in any suitable additive fabrication device in which there are forces that resist separation of two surfaces at $Z_0$.

It may be noted that manufacturing variations between different instances of the same model of an additive fabrication device may cause each device instance to behave differently during the above-described separation process. However, by performing the $Z_0$ calibration using the above-described techniques, a value of $Z_0$ that is specific to the particular device being operated may be determined.

In the above discussion, where a value of $Z_0$ or other $Z_{height}$ value is determined through measurement of mechanical forces, such value can be calculated by at least one processor during fabrication, before fabrication, or both (i.e., at least some aspects of a given calculation may be performed pre-fabrication with others performed during fabrication.). In the description above, where an "additive fabrication system" is referenced as performing calculations (e.g., calculating a gradient to determine $Z_0$), this description is intended to encompass both an additive fabrication device that includes one or more processors as well as additive fabrication device coupled to an external computing device, as the particular location at which the calculations are performed is not limited only to the device executing the fabrication process.

As such, the at least one processor calculating a value of $Z_0$ or other $Z_{height}$ value may be part of the additive fabrication device itself and/or may be located in a computing device coupled via a wired and/or wireless connection to the additive fabrication device. This coupling may be temporary in nature—for example, the processor of a computing device may calculate one or more $Z_0/Z_{height}$ values and wirelessly transmit that value to an additive fabrication device, which stores the value(s) and accesses them during later fabrication.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to form layers of material on a surface of a build platform, the additive fabrication device comprising:
   a container having an interior surface;
   a build platform having a build surface that opposes the interior surface of the container;
   one or more actuators configured to move the build platform relative to the container; and
   at least one controller configured to determine a position of the build platform relative to the container by:
   moving the build platform away from the container, wherein initially during said movement the build surface is in contact with the interior surface of the container and at completion of said movement the build surface is not in contact with the interior surface of the container;
   measuring a force applied to the build platform during said step of moving the build platform away from the container; and
   determining the position of the build platform relative to the container based at least in part on the measured force.

2. The additive fabrication device of claim 1, wherein the at least one controller is configured to measure the force applied to the build platform during said step of moving the build platform away from the container by measuring a back electromotive force upon at least one of the one or more actuators.

3. The additive fabrication device of claim 1, further comprising at least one force sensor configured to measure a force applied to the build platform, and wherein the at least one controller is configured to measure the force applied to the build platform during said step of moving the build platform away from the container based on a measurement output by the at least one force sensor.

4. The additive fabrication device of claim 1, wherein the at least one controller is configured to determine the position of the build platform relative to the container at least in part by identifying a position of the build platform at which a discontinuity in the measured force occurs.

5. The additive fabrication device of claim 1, wherein the at least one controller is configured to measure a force applied to the build platform at a plurality of different positions of the build platform during said step of moving the build platform away from the container.

6. The additive fabrication device of claim 5, wherein the at least one controller is configured to determine the position of the build platform relative to the container at least in part by calculating a rate of change of the measured force with respect to a change in a distance of the build platform from the container.

7. The additive fabrication device of claim 1, wherein the container is mounted on at least one compressive device.

8. The additive fabrication device of claim 1, wherein the at least one controller is further configured to wait for a predetermined length of time between moving the build platform toward the container until the build surface is in contact with the interior surface of the container and moving the build platform away from the container until the build surface is not in contact with the interior surface of the container.

9. A method for determining a position of a build platform in an additive fabrication device, the additive fabrication device comprising a build platform having a build surface and comprising a surface opposing the build surface, the method comprising:
moving the build platform away from the opposing surface, wherein initially during said movement the build surface is in contact with the opposing surface and at completion of said movement the build surface is not in contact with the opposing surface;
measuring a force applied to the build platform during said step of moving the build platform away from the opposing surface; and
determining a position of the build platform relative to the opposing surface based at least in part on the measured force.

10. The method of claim 9, wherein:
the additive fabrication device comprises a container comprising a liquid photopolymer,
when the build surface is in contact with the opposing surface, at least part of the build platform is immersed within the liquid photopolymer, and
wherein the measured force includes fluid forces resisting separation of the build surface and the opposing surface.

11. The method of claim 9, wherein determining the position of the build platform comprises identifying a position of the build platform at which a discontinuity in the measured force is observed.

12. The method of claim 9, wherein the additive fabrication device comprises one or more electrically driven actuators configured to move the build platform, and wherein measuring the force applied to the build platform comprises registering a back electromotive force upon at least one of the one or more actuators.

13. The method of claim 9, comprising measuring a force applied to the build platform at each of a plurality of positions of the build platform during said step of moving the build platform away from the container.

14. The method of claim 13, further comprising calculating a rate of change of the measured force with respect to a change in a distance of the build platform from the container.

* * * * *